US010122010B2

(12) United States Patent
Tajima et al.

(10) Patent No.: US 10,122,010 B2
(45) Date of Patent: Nov. 6, 2018

(54) SECONDARY BATTERY AND ELECTRONIC DEVICE INCLUDING THE SAME

(71) Applicant: Semiconductor Energy Laboratory Co., LTD., Atsugi-shi, Kanagawa-ken (JP)

(72) Inventors: Ryota Tajima, Kanagawa (JP); Yuugo Goto, Kanagawa (JP); Yumiko Yoneda, Kanagawa (JP); Junya Goto, Kanagawa (JP); Takuya Miwa, Kanagawa (JP); Masaaki Hiroki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 409 days.

(21) Appl. No.: 14/751,443

(22) Filed: Jun. 26, 2015

(65) Prior Publication Data

US 2016/0013469 A1    Jan. 14, 2016

(30) Foreign Application Priority Data

Jul. 11, 2014   (JP) .................................. 2014-143536
Sep. 25, 2014   (JP) .................................. 2014-194876

(51) Int. Cl.
*H01M 4/13*      (2010.01)
*H01M 4/139*    (2010.01)
(Continued)

(52) U.S. Cl.
CPC ............. *H01M 4/13* (2013.01); *H01M 4/139* (2013.01); *H01M 2/0275* (2013.01);
(Continued)

(58) Field of Classification Search
CPC ...... H01M 4/13; H01M 4/139; H01M 2/2075; H01M 10/0525
See application file for complete search history.

(56) References Cited

U.S. PATENT DOCUMENTS 8,927,127 B2    1/2015  Hosoya et al.
8,929,085 B2    1/2015  Franklin et al.
(Continued)

FOREIGN PATENT DOCUMENTS

| JP | 2001-266894 | * | 9/2001 | ............. H01M 4/70 |
| JP | 2007-280665 | * | 10/2007 | ............. H01M 4/02 |
| JP | 2013-140781 |   | 7/2013 | |

*Primary Examiner* — Helen Oi K Conley
(74) *Attorney, Agent, or Firm* — Nixon Peabody LLP; Jeffrey L. Costellia

(57) ABSTRACT

An electronic device having a novel structure, specifically, an electronic device having a novel structure that can be changed into various appearances is provided. Specifically, after an active material layer is formed on one or both surfaces of a current collector, the active material layer in a bent region is partly removed. The removed region of the active material layer can be in a linear shape, a dot shape, or a matrix shape, for example. After the active material layer is formed on one or both surfaces of the current collector, laser processing for removing part of the active material layer in an irradiation region is performed using laser light or the like. On the region where the surface of the current collector is exposed, the active material layer is not provided, and this region is a region that does not function as a battery. Owing to this region, a secondary battery with a wide movable region can be achieved.

16 Claims, 13 Drawing Sheets

(51) Int. Cl.
*H01M 10/0525* (2010.01)
*H01M 2/02* (2006.01)
*H01M 4/02* (2006.01)

(52) U.S. Cl.
CPC .............. *H01M 10/0525* (2013.01); *H01M 2002/0205* (2013.01); *H01M 2004/021* (2013.01); *H01M 2220/20* (2013.01); *H01M 2220/30* (2013.01); *Y02E 60/122* (2013.01)

(56) References Cited

U.S. PATENT DOCUMENTS

| | | |
|---|---|---|
| 2013/0143090 A1 | 6/2013 | Hosoya et al. |
| 2015/0062477 A1 | 3/2015 | Hatsumi et al. |
| 2015/0243962 A1 | 8/2015 | Hiroki et al. |
| 2015/0261254 A1 | 9/2015 | Hiroki et al. |
| 2015/0349375 A1 | 12/2015 | Takahashi et al. |

\* cited by examiner

FIG. 5A
FIG. 5C
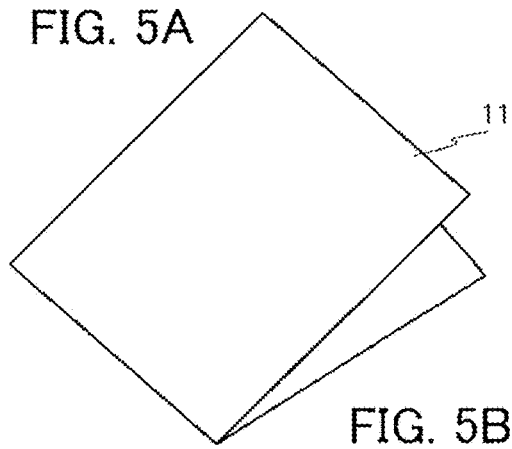
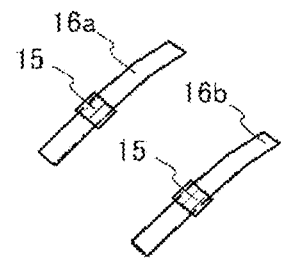
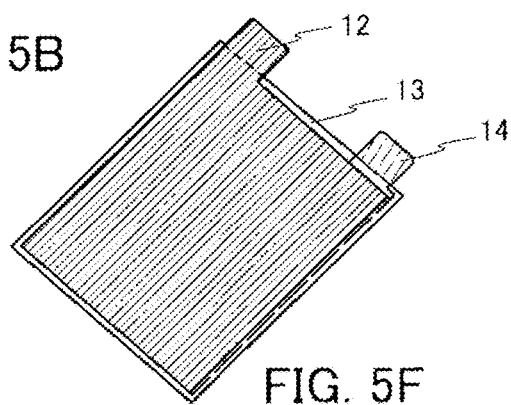
FIG. 5B
FIG. 5D
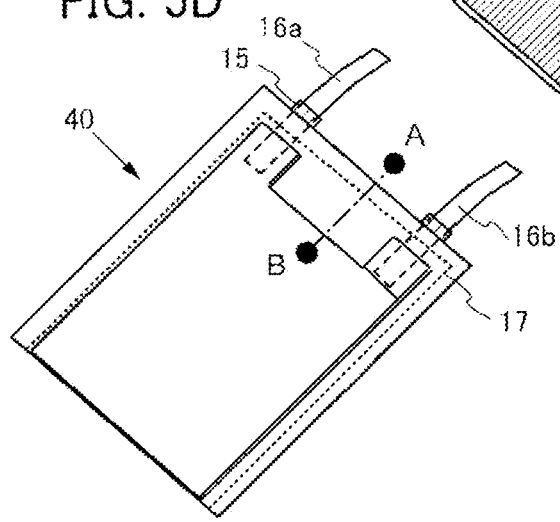
FIG. 5F
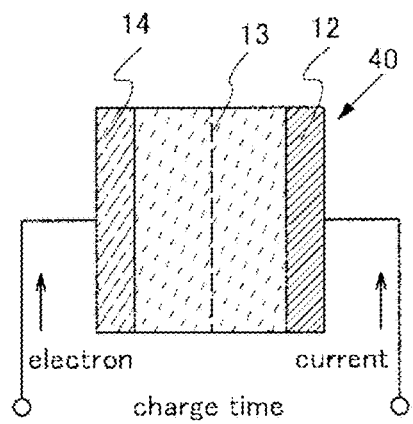
FIG. 5E
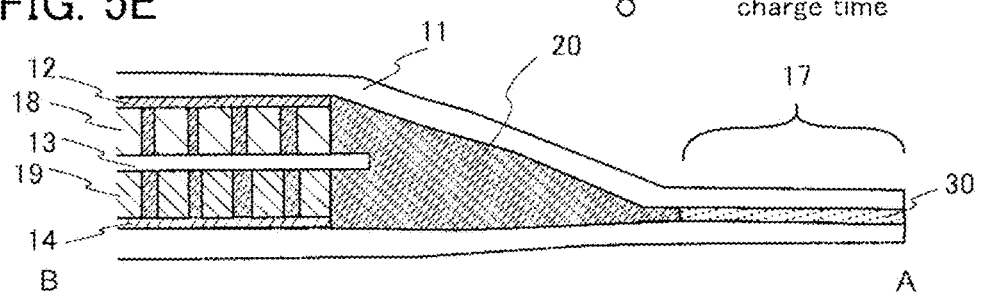

SECONDARY BATTERY AND ELECTRONIC DEVICE INCLUDING THE SAME

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a method for manufacturing a semiconductor device, a display device, a light-emitting device, a power storage device, a lighting device, or an electronic device. In particular, one embodiment of the present invention relates to an electronic device and its operating system.

Note that electronic devices in this specification generally mean devices including secondary batteries, and electro-optical devices including secondary batteries, information terminal devices including secondary batteries, and the like are all electronic devices.

2. Description of the Related Art

Electronic devices carried around by users and electronic devices worn by users have been actively developed. For example, a thin portable electronic book is disclosed in Patent Document 1.

Such portable electronic devices and wearable electronic devices operate using secondary batteries as power sources. Portable electronic devices need to withstand the use for a long period and thus may incorporate high-capacity secondary batteries. Since high-capacity secondary batteries are large in size, their incorporation in electronic devices increases the weight of the electronic devices. Thus, small or thin high-capacity secondary batteries that can be incorporated in portable electronic devices are under development.

Patent Document 1 discloses a square lithium-ion secondary battery in which an active material mixture layer consists of a region with a plurality of openings and a region without openings and at least a bent portion of a collective sheet is covered with the region with the plurality of openings.

REFERENCE

Patent Document

[Patent Document 1] Japanese Published Patent Application No. 2013-140781

SUMMARY OF THE INVENTION

A metal can that is used as an exterior body has a problem of increasing the weight of a secondary battery. Moreover, it is difficult to manufacture a thin metal can by molding and also to fabricate a secondary battery using a thin metal can, in order to obtain a thin secondary battery.

The use of a film (also referred to as a laminate film) including a stack of metal foil (e.g., aluminum foil, stainless steel foil) and a resin (heat-seal resin) as an exterior body allows fabrication of a secondary battery that is thinner and more lightweight than a secondary battery that uses a metal can.

In order that a user can comfortably wear a display device used while being worn on a human body, the display device needs to have a light weight and a small size, and in addition, the whole electronic device including a driver device for the display device and a power source needs to have a light weight.

An electronic device having a novel structure, specifically, an electronic device having a novel structure that can change its form into various appearances is provided.

An object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

In the case where a film which has lower strength than a metal can is used as an exterior body of a secondary battery, a current collector provided inside the exterior body, an active material layer provided on a surface of the current collector, or the like might be damaged when force is externally applied to the secondary battery.

In the case of fabricating a flexible secondary battery or a bent secondary battery, when a plurality of electrodes are bent, the plurality of electrodes are bent with different curvatures. An electrode far from a curvature center is more bent than an electrode close to the curvature center, so that the position of an end portion of the electrode far from the curvature center is shifted or the end portion of the electrode far from the curvature center is extended. The end portion of the electrode includes a portion electrically in contact with a lead (the portion is also referred to as an electrode tab portion). Note that the electrode tab portion is not provided with an active material layer.

A thin secondary battery using a laminate film as its exterior body has an electrode shape that is likely to be cracked. That is, an electrode in the thin secondary battery includes a projection (also referred to as an electrode tab portion or a lead terminal portion) for leading a lead electrode.

In the case of fabricating a thin secondary battery, a plurality of combinations each including a first electrode (positive electrode), an active material layer, and a second electrode (negative electrode) are stacked in a region surrounded by an exterior body. In addition, after the plurality of first electrodes are made to overlap with each other, the first electrodes are subjected to ultrasonic welding or the like in order to fix end portions thereof. Similarly, after the second electrodes are made to overlap with each other, the second electrodes are subjected to ultrasonic welding or the like in order to fix end portions thereof.

With the increase in the number of stacked layers, the capacity and the thickness are increased. Therefore, the difference in curvature radius becomes larger, and the position of the end portion of the electrode far from the curvature center is significantly shifted or the end portion of the electrode far from the curvature center is extended as compared with the electrode close to the curvature center.

Specifically, after an active material layer is formed on one or both surfaces of a current collector, the active material layer in a bent region is partly removed. The removed region of the active material layer can be in a linear shape, a dot shape, or a matrix shape, for example.

One structure of the invention disclosed in this specification is a secondary battery which includes a current collector, a plurality of active material layers in contact with one surface of the current collector, and an electrolyte solution in contact with the current collector and the plurality of active material layers. In the secondary battery, the plurality of active material layers are arranged in either a long-side direction or a short-side direction of the current collector with a distance provided therebetween.

The active material layers are formed in such a manner that an active material layer is formed with a constant thickness over an entire surface of the current collector and then partly removed by laser light irradiation, cutting, pressing, or the like to form a pattern (e.g., a stripe pattern, a dot pattern, a matrix pattern) including the exposed surface of the current collector. For example, in the case of a stripe pattern, the distance between adjacent active material layers is set constant. Specifically, after an active material layer is formed on one or both surfaces of a current collector, laser processing for removing part of the active material layer in an irradiation region is performed using laser light or the like.

On the region where the surface of the current collector is exposed, the active material layer is not provided, and this region serves as a region for connecting the adjacent active material layers. Owing to this region, a secondary battery with a wide movable region, for example, a secondary battery having a movable range of an end portion of the current collector extending in a top surface direction or a bottom surface direction, can be achieved.

Furthermore, part of a current collector used for a secondary battery may be subjected to cutting processing to have a complex pattern shape (e.g., a meandering shape). This suppresses the positional shift of an end portion of the current collector far from the curvature center from an end portion of the current collector close to the curvature center because of the larger degree of bending of the current collector far from the curvature center than that of the current collector close to the curvature center, or relieves tension applied to the current collector far from the curvature center. The secondary battery may have a complex shape corresponding to an electronic device; in such a case, it is preferable that the current collector also have a shape corresponding to the electronic device. For example, in the case of an eyeglass-type electronic device, a structure with which the secondary battery is kept in part of a frame of the eyeglass, for example, in a temple, may be employed.

By adjusting the intensity of laser light, part of the current collector can be removed. By setting the laser light intensity lower than that at which part of the current collector can be removed, only the active material layer in the region irradiated with the laser light can be removed while leaving the current collector.

Another structure of the invention disclosed in this specification is a secondary battery which includes a current collector, a plurality of active material layers in contact with the current collector, and an electrolyte solution in contact with the current collector and the plurality of active material layers. In the secondary battery, the current collector includes a meandering portion when seen from the above. In addition, the meandering portion includes at least two portions having a small width, and at least one of the at least two portions overlaps with a boundary between adjacent active material layers of the plurality of active material layers.

In the above-described structure, the meandering portion can be referred to as a pattern with a meandering shape, a wave shape, or a shape including a plurality of curves, and the secondary battery can be bent in the meandering portion. When the secondary battery is bent in a top surface direction or a bottom surface direction of an end portion of the secondary battery by holding up or down the end portion, the end portion is pulled and the meandering portion is stretched; however, the current collector is not cut and can withstand the change in the shape of the secondary battery.

In the case of using a positive electrode current collector having a meandering shape (meandering pattern) including a plurality of bending portions, the shape of the negative electrode current collector is different from that of the positive electrode current collector. In the case of providing tab electrodes, if the distance between a positive electrode and a negative electrode is short, a short circuit might occur. Thus, the positive electrode current collector and the negative electrode current collector are made to overlap with each other so that a large distance is kept between the tab electrode of the positive electrode and the tab electrode of the negative electrode. Note that the tab electrodes are electrically connected to tip portions of the meandering patterns of the corresponding current collectors.

Moreover, the method for forming the active material layer is not limited to the method in which an active material layer is formed with a constant thickness over an entire surface of a current collector and then partly removed by laser light irradiation, cutting, pressing, or the like. The active material layer may partly have a small thickness by being partly pressed. By partly pressing the active material layer, stress is also applied to the current collector, so that the current collector can partly have a small thickness, which also have an effect of increasing the movable range of the end portion of the secondary battery.

Another structure of the invention disclosed in this specification is a secondary battery which includes a current collector, an active material layer in contact with the current collector, and an electrolyte solution in contact with the active material layer. In the secondary battery, the active material layer includes a region having a large thickness and a region having a small thickness, and the region having a small thickness is provided in a linear shape over the current collector.

In each of the above-described structures, the active material layer includes lithium. The secondary battery with any of the above-described structures is a lithium-ion secondary battery.

In each of the above-described structures, a plurality of current collectors stacked are included and are surrounded by an exterior body of a film (typically, a laminate film); thus, a thin secondary battery is achieved. Embossing may be performed on the film (typically the laminate film) for easy bending.

A flexible secondary battery or a bent secondary battery can be achieved.

When an electrode is bent by bending the secondary battery, generation of a crack in the electrode due to the stretching of an end portion of the electrode is prevented because part of the electrode or part of the active material layer is cut. As a result, a bendable secondary battery or a bent secondary battery can have improved reliability. Furthermore, in the case where a housing of an electronic device has flexibility, the electronic device including the battery can be bent wholly or partly.

BRIEF DESCRIPTION OF THE DRAWINGS

In the accompanying drawings:
FIGS. 5A to 5F are perspective views and cross-sectional views illustrating one embodiment of the present invention;

DETAILED DESCRIPTION OF THE INVENTION

Figure 1A:
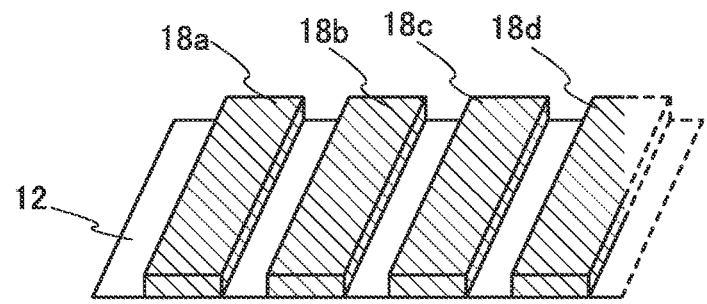
FIGS. 1A to 1D are a perspective view and cross-sectional views illustrating one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to the description of the embodiments below.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, size, range, or the like disclosed in the drawings and the like.

The ordinal number such as "first", "second", and "third" are used to avoid confusion among components.

Embodiment 1

In this embodiment, an electrode for a secondary battery and a method for manufacturing a secondary battery according to one embodiment of the present invention will be described with reference to FIGS. 1A to 1D, FIGS. 2A to 2D, FIGS. 3A to 3D, FIGS. 4A to 4E, and FIGS. 5A to 5F.

Figure 1B:
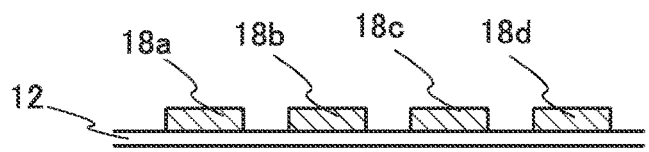

FIG. 1A is a perspective view illustrating a plurality of positive electrode active material layers formed on a positive electrode current collector 12, and FIG. 1B is a cross-sectional view thereof. The plurality of positive electrode active material layers are formed in contact with one surface of the positive electrode current collector 12. In other words, the plurality of positive electrode active material layers are formed in a plurality of divided regions in contact with one surface of the positive electrode current collector 12.

The manufacturing method is as follows: after slurry is applied and dried, a positive electrode active material layer is partly removed by laser light irradiation to form a plurality of positive electrode active material layers 18a, 18b, 18c, and 18d.

As a laser light source, ML-7320DL (manufactured by Miyachi Technos Corp.) which emits light with an emission wavelength of approximately 1065 nm is used. Laser light scanning is performed by moving a galvanometer mirror after moving a stage.

Figure 1C:
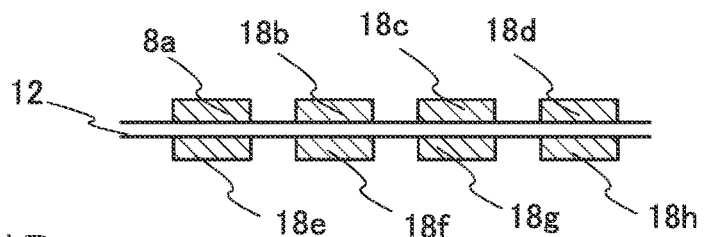

FIG. 1C is a cross-sectional view where the plurality of positive electrode active material layers 18a, 18b, 18c, and 18d are formed on one surface and a plurality of positive electrode active material layers 18e, 18f, 18g, and 18h are formed on the other surface. Although an example of arranging the positive electrode active material layers on both surfaces to have aligned end portions is illustrated in FIG. 1C, the arrangement is not particularly limited to this example.

Figure 1D:
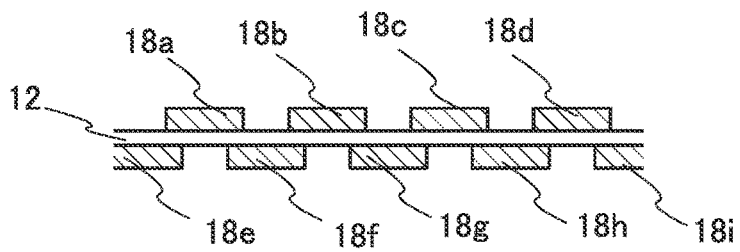

Furthermore, FIG. 1D illustrates an example in which the plurality of positive electrode active material layers 18a, 18b, 18c, and 18d are formed on one surface and the plurality of positive electrode active material layers 18e, 18f, 18g, 18h, and 18i are formed on the other surface in positions shifted from the positions of the positive electrode active material layers 18a, 18b, 18c, and 18d.

Figure 2A:
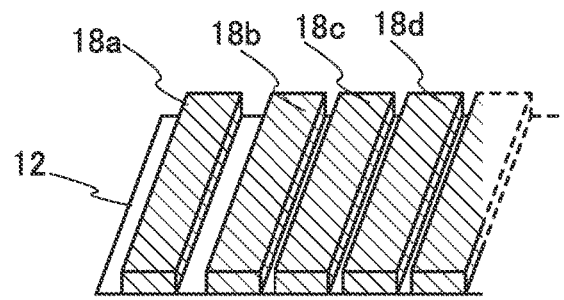
FIGS. 2A to 2D are a perspective view and cross-sectional views illustrating one embodiment of the present invention.
Figure 2B:
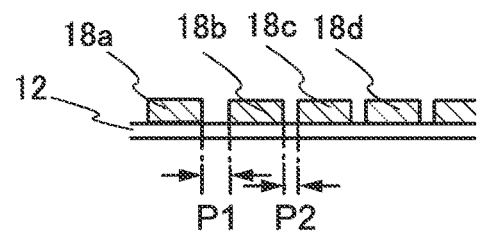

Although the plurality of positive electrode active material layers are arranged at substantially constant distances in the example in FIGS. 1A to 1D, the distances between the plurality of positive electrode active material layers are not particularly limited. FIG. 2B illustrates an example in which a distance P1 between the positive electrode active material layer 18a and the positive electrode active material layer 18b is longer than a distance P2 between the positive electrode active material layer 18b and the positive electrode active material layer 18c. Note that FIG. 2A is a perspective view corresponding to FIG. 2B.

Figure 2C:
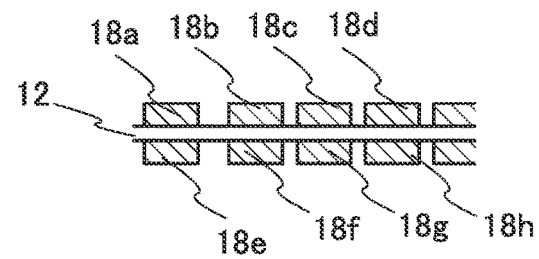

FIG. 2C is a cross-sectional view where the plurality of positive electrode active material layers 18a, 18b, 18c, and 18d are formed on one surface and the plurality of positive electrode active material layers 18e, 18f, 18g, and 18h are formed on the other surface.

Figure 2D:
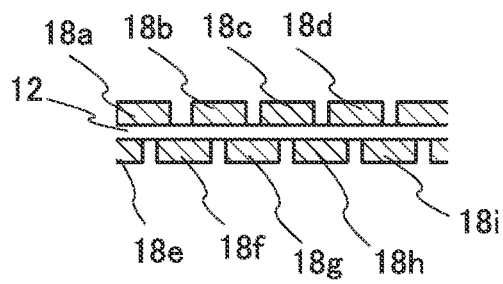

Furthermore, FIG. 2D illustrates an example in which the plurality of positive electrode active material layers 18a, 18b, 18c, and 18d are formed on one surface and the plurality of positive electrode active material layers 18e, 18f, 18g, 18h, and 18i are formed on the other surface in positions shifted from the positions of the positive electrode active material layers 18a, 18b, 18c, and 18d.

Figure 3A:
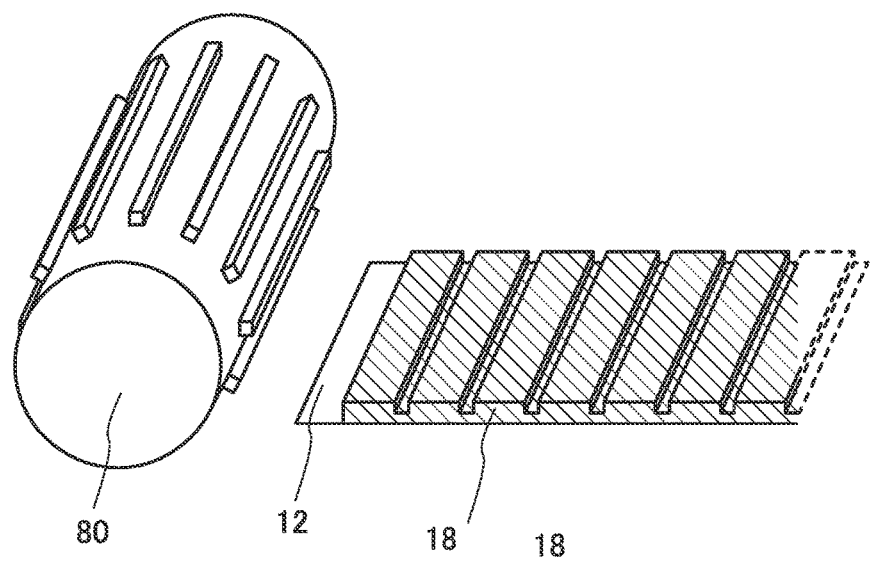
FIGS. 3A to 3D are a perspective view and cross-sectional views illustrating one embodiment of the present invention.
Figure 3B:
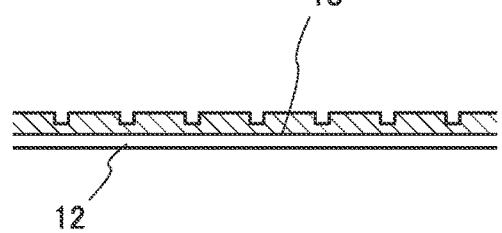
Figure 3C:
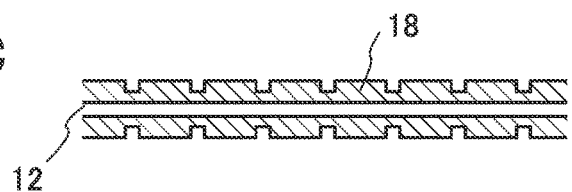
Figure 3D:
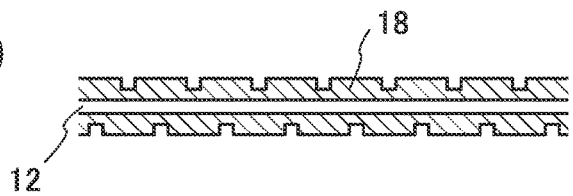

FIGS. 3A and 3B are a perspective view and a cross-sectional view, respectively, where a roll 80 having projections is used to form a positive electrode active material layer 18 which partly has a different thickness. FIG. 3C illustrates an example in which positive electrode active material layers 18 which partly have a different thickness are provided on both surfaces. FIG. 3D illustrates an example in which one positive electrode active material layer 18 is formed on one surface and another positive electrode active material layer 18 is provided on the other surface so that depressions of one of the positive electrode active material layers 18 are arranged in positions shifted from the positions of depressions of the other positive electrode active material layer 18.

Figure 4A:
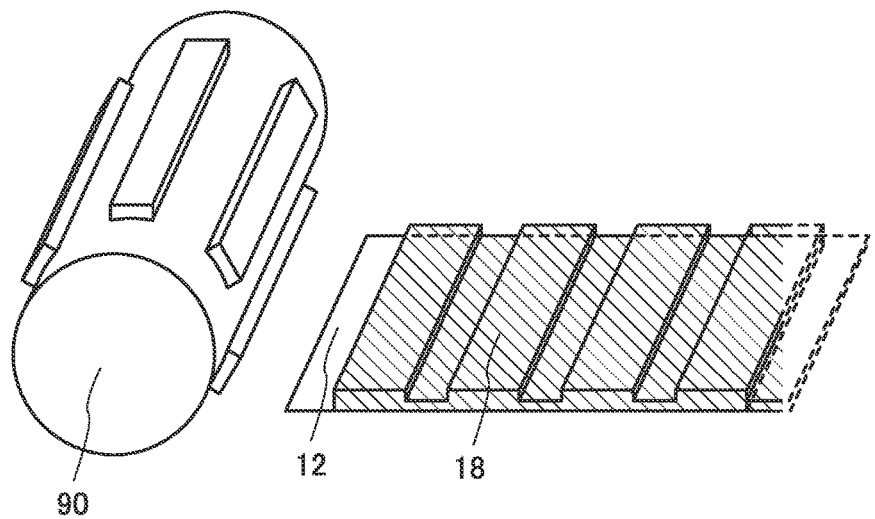
FIGS. 4A to 4E are perspective views and cross-sectional views illustrating one embodiment of the present invention.
Figure 4B:
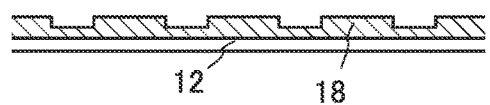
Figure 4C:
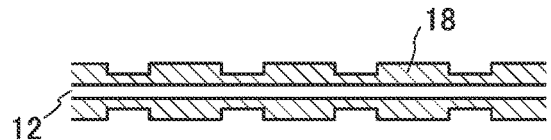
Figure 4D:
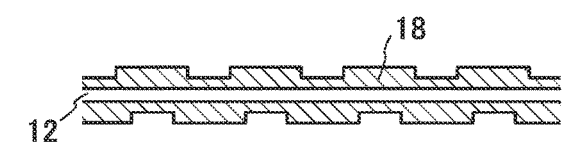

FIGS. 4A and 4B are a perspective view and a cross-sectional view, respectively, where a roll 90 having projections which are arranged at distances longer than those of the projections of the roll 80 is used to form a positive electrode active material layer 18 which partly has a different thickness. FIG. 4C illustrates an example in which positive electrode active material layers 18 which partly have a different thickness are provided on both surfaces. FIG. 4D illustrates an example in which one positive electrode active material layer 18 is formed on one surface and another positive electrode active material layer 18 is provided on the other surface so that depressions of one of the positive electrode active material layers 18 are arranged in positions shifted from the positions of depressions of the other positive electrode active material layer 18.

Figure 4E:
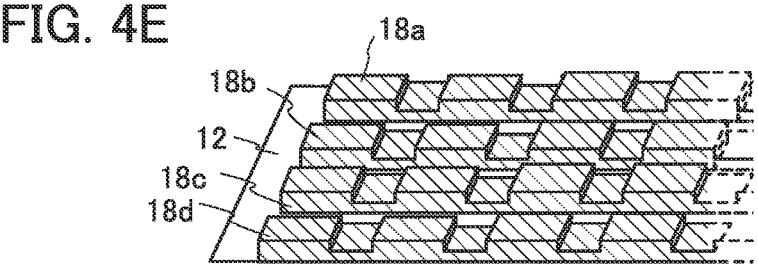

FIG. 4E illustrates an example in which after the positive electrode active material layer 18 which partly has a different thickness is formed using the roll 90 having projections, laser light irradiation is performed to form the plurality of positive electrode active material layers 18a, 18b, 18c, and 18d.

FIGS. 1A to 1D, FIGS. 2A to 2D, FIGS. 3A to 3D, and FIGS. 4A to 4E present 13 different variations in total; any of the variations may be employed. Although the examples of the positive electrode active material layer are described in this embodiment, a negative electrode active material layer may be subjected to laser irradiation or pressing with a roll.

An example of manufacturing a secondary battery 40 using the positive electrode current collector 12 that is provided with the positive electrode active material layer illustrated in any of FIGS. 1A to 1D, FIGS. 2A to 2D, FIGS. 3A to 3D, and FIGS. 4A to 4E will be described below.

FIG. 5B is a perspective view where a positive electrode, a separator, and a negative electrode are stacked. The positive electrode includes at least a current collector and a positive electrode active material layer. The negative electrode includes at least a current collector and a negative electrode active material layer. Although the storage battery electrode (positive electrode or negative electrode) in the shape of a rectangular sheet is illustrated in FIG. 5B, the shape of the storage battery electrode is not limited thereto and may be any appropriate shape. An active material layer is formed over only one surface of a current collector in FIG. 5B; however, active material layers may be formed on both surfaces of a current collector. The active material layer does not necessarily need to be formed over the entire surface of the current collector and a region that is not coated, such as a region for electrical connection to an electrode lead, is provided as appropriate.

There is no particular limitation on the current collector used in a positive electrode or a negative electrode as long as it has high conductivity without causing a significant chemical change in the secondary battery. For example, the current collector can be formed using a metal such as gold, platinum, iron, nickel, copper, aluminum, titanium, tantalum, or manganese, or an alloy thereof (e.g., stainless steel). Furthermore, coating with carbon, nickel, titanium, or the like may be performed. Silicon, neodymium, scandium, molybdenum, or the like may be added to improve heat resistance. The current collector can each have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collector may be formed to have micro irregularities on the surface thereof in order to enhance adhesion to the active material. The current collector preferably has a thickness of more than or equal to 5 μm and less than or equal to 30 μm.

For the active material used in a positive electrode or a negative electrode, a material capable of reversible reaction with carrier ions such as lithium ions can be used. The average diameter or diameter distribution of active material particles can be controlled by crushing, granulation, and classification by an appropriate means.

Examples of positive electrode active materials that can be used for the positive electrode active material layer 18 include a composite oxide with an olivine structure, a composite oxide with a layered rock-salt structure, and a composite oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material.

As the separator 13, an insulator such as cellulose (paper), polyethylene with pores, or polypropylene with pores can be used.

As an electrolyte in the electrolyte solution, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolyte solution, a material with the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, safety against liquid leakage and the like is improved.

Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as a solvent of the electrolyte solution can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolyte solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material which can reversibly react with lithium ions can be used for a negative electrode active material of the negative electrode active material layer 19; for example, a lithium metal, a carbon-based material, an alloy-based material, or the like can be used.

The lithium metal is preferable because of its low redox potential (−3.045 V lower than that of a standard hydrogen electrode) and high specific capacity per unit weight and per unit volume (3860 mAh/g and 2062 $mAh/cm^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a material containing two or more of single crystal silicon, amorphous silicon, polycrystal silicon, $Si_2O_3$, $Si_3O_4$, $Si_2O$, and $SiO_2$ and is a colored material. Thus, SiO can be distinguished from $SiO_x$, which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, for the negative electrode active material, $Li_{(3-x)}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active material.

In the power storage unit of this embodiment, for example, the separator 13 has a thickness of approximately 15 μm to 30 μm, the current collector of the positive electrode 101 has a thickness of approximately 10 μm to 40 μm, the positive electrode active material layer has a thickness of approximately 50 μm to 100 μm, the negative electrode active material layer has a thickness of approximately 50 μm to 100 μm, and the current collector of the negative electrode 102 has a thickness of approximately 5 μm to 40 μm.

A sheet made of a flexible base is prepared as an exterior body. As the sheet, a stack, a metal film provided with an adhesive layer (also referred to as a heat-seal layer) or sandwiched between adhesive layers, is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film, is used as the sheet. This sheet is cut to obtain a film 11. The film 11 is folded in half so that two end portions overlap, and is sealed on three sides with an adhesive layer.

Then, the film 11 is folded in half at the center portion, so that a state illustrated in FIG. 5A is made.

The positive electrode current collector 12, the separator 13, and a negative electrode current collector 14 that are stacked to constitute a secondary battery as illustrated in FIG. 5B are prepared.

Then, a lead electrode 16a and a lead electrode 16b having sealing layers 15 illustrated in FIG. 5C are prepared. The lead electrode 16a and the lead electrode 16b are each also referred to as a lead terminal and provided in order to lead a positive electrode or a negative electrode of a secondary battery to the outside of an exterior film. The lead electrode 16a is electrically connected to the positive electrode. As a material of the lead electrode 16a, a material which can be used for the positive electrode current collector, such as aluminum, can be used. The lead electrode 16b is electrically connected to the negative electrode. As a material of the lead electrode 16b, a material which can be used for the negative electrode current collector, such as copper, can be used.

Then, the lead electrode 16a is electrically connected to a protruding portion of the positive electrode current collector 12 by ultrasonic welding or the like. The lead electrode 16b is electrically connected to a protruding portion of the negative electrode current collector 14 by ultrasonic welding or the like.

Then, two sides of the film 11 are sealed by thermocompression bonding, and one side is left open for introduction of an electrolyte solution (hereinafter the shape of a film in this state is also referred to as a form of a bag). In thermocompression bonding, the sealing layers 15 provided over the lead electrodes are also melted, thereby fixing the lead electrodes and the film 11 to each other. After that, in a reduced-pressure atmosphere or an inert atmosphere, a desired amount of electrolyte solution is introduced to the inside of the film 11 in the form of a bag. Lastly, the side of the film which has been left open without being subjected to thermocompression bonding is sealed by thermocompression bonding.

In this manner, the secondary battery illustrated in FIG. 5D can be manufactured. An edge region indicated by a dotted line in FIG. 5D is a thermocompression-bonded region 17. FIG. 5E is a cross-sectional view taken along a dashed-dotted line A-B in FIG. 5D. As illustrated in FIG. 5E, the positive electrode current collector 12 is provided with the plurality of positive electrode active material layers 18, and the negative electrode current collector 14 is provided with the plurality of negative electrode active material layers 19. An electrolyte solution 20 is provided between the plurality of positive electrode active material layers 18 and between the plurality of negative electrode active material layers 19. In the secondary battery 4 as illustrated in FIG. 5E, an end portion is sealed with a bonding layer 30, and the other space is provided with an electrolytic solution 20. The bonding layer 30 is a solid formed in such a manner that part of the film 11 is melted at the time of thermocompression bonding and then cooled.

In the obtained secondary battery 40, the active material layer is partly removed; therefore, the stress applied to the secondary battery when the secondary battery is bent can be relieved. With the plurality of active material layers, the secondary battery 40 can easily bend and the movable range of an end portion of the secondary battery can be increased.

Here, a current flow in charging a secondary battery will be described with reference to FIG. 5F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Two terminals in FIG. 5F are connected to a charger, and a secondary battery 40 is charged. As the charge of the secondary battery 40 proceeds, a potential difference between electrodes increases. In FIG. 5F, electrons flow from one terminal outside the secondary battery 40 to the positive electrode current collector 12; thus, current flows from the positive electrode a current collector 12 to the negative electrode current collector 14 in the secondary battery 40. The positive direction in FIG. 5F is the direction of the current that flows from the negative electrode current collector 14 to the other terminal outside the secondary battery 40. In other words, a current flows in the direction of a flow of a charging current.

Although an example of a small battery used in a portable information terminal or the like is described in this embodiment, one embodiment of the present invention is not particularly limited to this example. Application to a large battery provided in a vehicle or the like is also possible.

Embodiment 2

In this embodiment, an example of manufacturing a secondary battery using a current collector including a meandering portion will be described below.

First, a positive electrode active material layer is formed on one or both surfaces of a band-like metal foil.

Figure 6A:
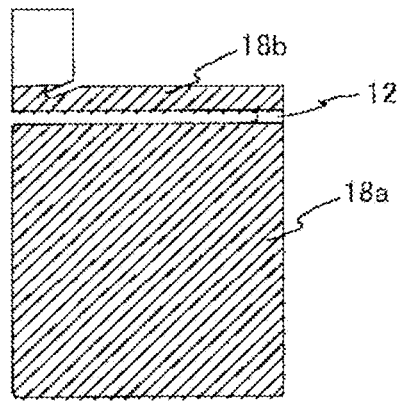
FIGS. 6A to 6D are plan views and photographs of one embodiment of the present invention.

Next, laser light irradiation is performed to selectively remove the positive electrode active material layer. The positive electrode active material layer over two areas, which are a region having a small width that is connected to an electrode lead in a later step and an area having a small width in a meandering portion, is removed. Then, laser processing is performed to selectively remove both the positive electrode active material layer and the metal foil. Here, the laser irradiation is performed so that the contour of the current collector including the meandering portion is irradiated; thus, the shape of the current collector is formed. At this stage, the state illustrated in FIG. 6A can be obtained. As illustrated in FIG. 6A, part of the current collector (the root portion of the meandering portion) is exposed, so that the positive electrode active material layer 18a and the positive electrode active material layer 18b are formed.

Although the external shape of the current collector is formed by laser processing, a cutter or a punching machine may be used to process the metal foil into a desired shape, and then the processed metal foil may be formed into the current collector having a complicated shape by laser processing.

The laser processing is preferably performed after an active material layer is formed on one or both surfaces of the positive electrode current collector 12. A cutting surface formed by laser light irradiation is desirable because the current collector and the active material layer can be firmly fixed to each other by application of strong energy.

As illustrated in FIG. 6A, the number of portions having a small width in the meandering portion of the current collector is at least two; at least one of the portions (the root portion of the meandering pattern) overlaps with the boundary of adjacent active material layers (a region between the positive electrode active material layer 18a and the positive electrode active material layer 18b).

Figure 6B:
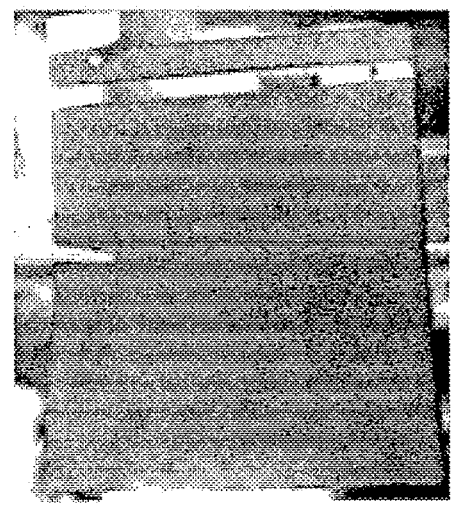

The positive electrode current collector 12 held by tweezers is shown in the photograph of FIG. 6B. As illustrated in FIG. 6A, the width of the meandering portion in the positive electrode current collector 12 is not even.

Next, a negative electrode active material layer is formed on one or both surfaces of a band-like metal foil.

Next, laser light irradiation is performed to selectively remove the negative electrode active material layer. The negative electrode active material layer over a region having a small width that is connected to an electrode lead in a later step is removed. Then, laser processing is performed. This laser processing is performed so that the contour of the current collector including the meandering portion is irradiated; thus, the shape of the current collector is formed.

Figure 6C:
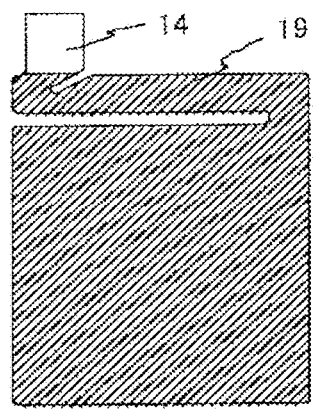
Figure 6D:
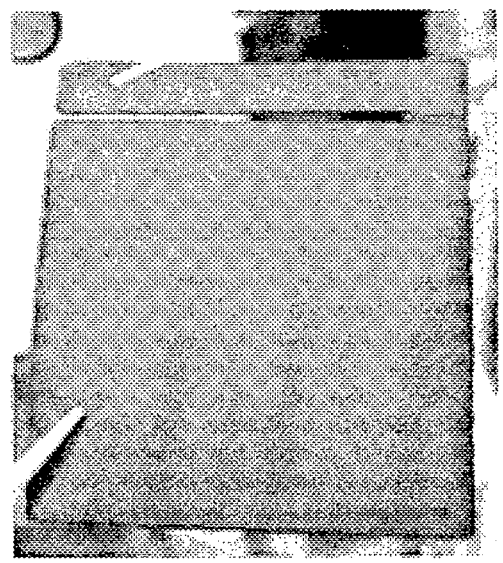

A schematic plan view of the negative electrode current collector 14 and the negative electrode active material layer 19 is shown in FIG. 6C, and a photograph of the negative electrode current collector held by tweezers is shown in FIG. 6D.

As illustrated in FIGS. 6A to 6D, both the positive electrode current collector and the negative electrode current collector include the meandering portions, which are partly different in width from each other. The meandering portion can also be referred to as a bending portion when folding is performed. The meandering portion has a bending pattern shape including a linear pattern. In this specification, the shape in which part of the contour of the current collector includes two or more repeated bends at 90° or more in the plan view is referred to as a meandering shape. Furthermore, the shape in which part of the contour of the current collector in the plan view has a rectangular wave shape, a triangular wave shape, an S-shape, or the like is also included in the meandering shape. Note that the bends in the meandering shape do not necessary have the same pattern and a shape including irregular bends may be employed. A portion cut for forming the meandering portion is referred to as a slit.

When the positive electrode current collector and the negative electrode current collector are made to overlap with each other in a later step, the positive electrode active material layer might be positioned in a region overlapping with the slit of the negative electrode current collector. For example, in the case of the current collectors illustrated in FIGS. 6A to 6D, the slit of the negative electrode current collector overlaps with the area having a small width in the meandering portion of the positive electrode current collector. If the positive electrode active material layer exists over this area, the absence of the negative electrode active material layer in the region overlapping with the positive electrode active material layer arises. This absence might generate a problem in the battery reaction. Specifically, carrier ions released from the positive electrode active material layer might be concentrated in the negative electrode active material layer in a region closest to the slit and might be precipitated on a surface of the negative electrode active material layer. Therefore, the positive electrode active material layer that does not overlap with the negative electrode active material layer, that is, the positive electrode active material layer overlapping with the area having a small width in the meandering portion of the positive electrode current collector in the case of FIGS. 6A to 6D, is removed by laser light irradiation. In this way, the precipitation of carrier ions can be prevented.

For the above-described reason, the width of the slit of the positive electrode is preferably larger than or equal to that of the slit of the negative electrode. By setting the width of the slit of the positive electrode larger, the absence of the negative electrode active material layer in the region overlapping with the positive electrode active material layer can be avoided or decreased. Therefore, the precipitation of carrier ions on the surface of the negative electrode active material can be prevented.

Figure 7A:
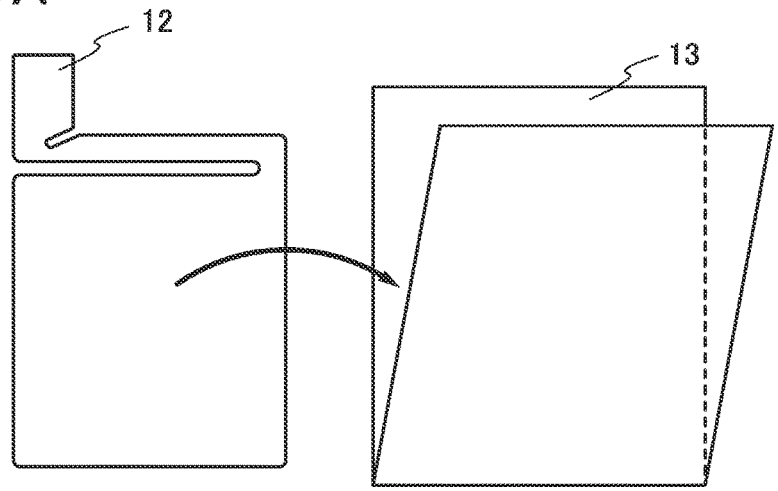
FIGS. 7A to 7C are plan views and a perspective view illustrating one embodiment of the present invention.
Figure 7B:
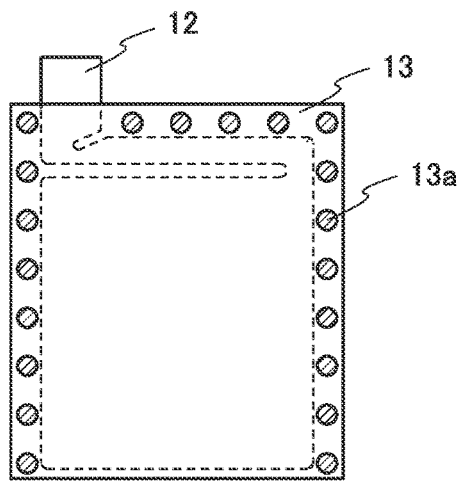

Next, as illustrated in FIG. 7A, the positive electrode current collector 12 is sandwiched by the separator 13. Then, in the separator 13, portions 13a in the region not overlapping with the positive electrode current collector 12 are bonded so that the positive electrode current collector 12 is covered by the separator 13 (FIG. 7B). Note that when polypropylene or polyvinylidene fluoride (PVDF) is used as the separator 13, bonding can be performed by heat welding at 190° C. to 230° C.

Figure 7C:
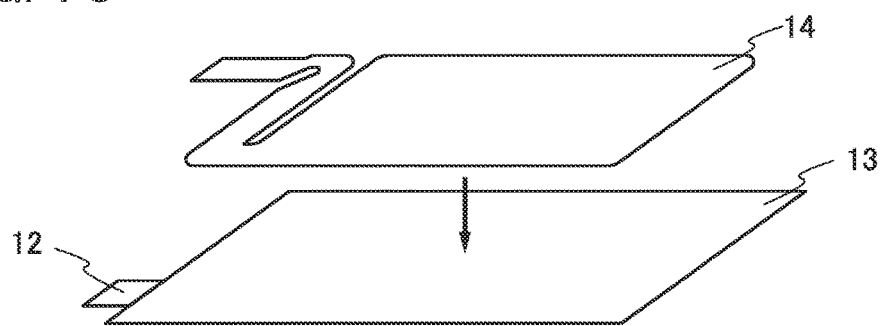

Next, as illustrated in FIG. 7C, the positive electrode current collector 12 covered by the separator 13 and the negative electrode current collector 14 are stacked. At this time, it is preferable that a plurality of positive electrode current collectors 12 and a plurality of negative electrode current collectors 14 be stacked. In this case, it is preferable that the positive electrode current collectors 12 covered with the separators 13 and the negative electrode current collectors 14 be alternately stacked. In addition, it is preferable that electrode tab portions of the positive electrode current collectors 12 overlap with each other, and electrode tab portions of the negative electrode current collectors 14 overlap with each other. By stacking and electrically connecting the plurality of positive electrode current collectors 12 and the plurality of negative electrode current collectors 14, the capacity of the secondary battery can be increased.

Then, the stacked separators 13, positive electrode current collectors 12, and negative electrode current collectors 14 are preferably fixed in a bundle. The fixing can be performed with a resin tape such as an adhesive tape or a polyimide film onto which an adhesive agent is applied or the like.

Next, the electrode tab portions of the positive electrode current collectors 12 are electrically connected to one lead electrode 16a. Furthermore, the electrode tab portions of the negative electrode current collectors 14 are electrically connected to another lead electrode 16b. The electrical connection can be made by ultrasonic welding. In the case where the plurality of positive electrode current collectors 12 and the plurality of negative electrode current collectors 14 are stacked, the step of ultrasonic welding between the lead electrode 16a and the electrode tab portions of the plurality of positive electrode current collectors 12 and the step of ultrasonic welding between the lead electrode 16b and the electrode tab portions of the plurality of negative electrode current collectors 14 can be performed at a time. Thus, electrical connection among the plurality of positive electrode current collectors 12 and electrical connection among the plurality of negative electrode current collectors 14 can be made.

Note that the lead electrode connected to the positive electrode current collector 12 may be formed of a material that can be used in the positive electrode current collector, such as aluminum. Furthermore, the lead electrode connected to the negative electrode current collector 14 may be formed of a material that can be used in the negative electrode current collector, such as copper. The lead electrode electrically connected to the positive electrode current collector 12 has the same potential as the positive electrode current collector 12, and the same applies to the negative electrode. Materials that can be used in the current collectors can be used in the lead electrodes connected thereto.

Figure 8A:
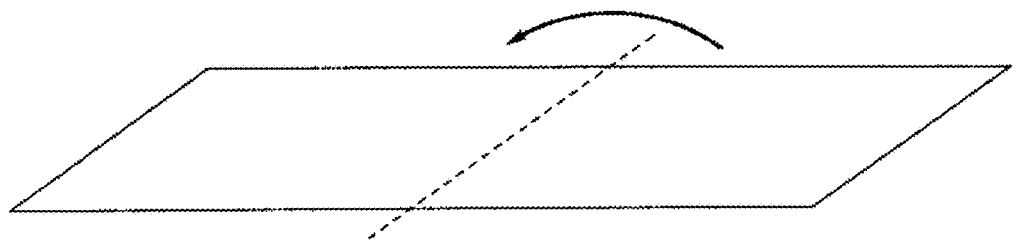
FIGS. 8A to 8E are perspective views illustrating one embodiment of the present invention.
Figure 8B:
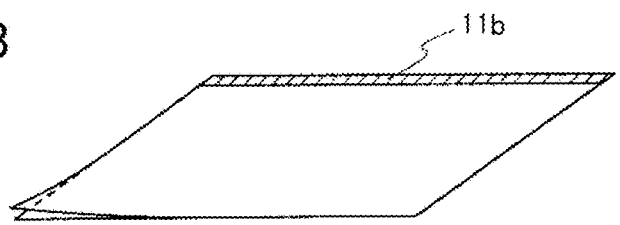

Next, as illustrated in FIG. 8A, the film 11 is folded at the center portion. Then, as illustrated in FIG. 8B, the perimeter of the film 11 except two sides is sealed by thermocompression bonding. In this embodiment, since one side is made by folding the film 11 as illustrated in FIG. 8B, only one side 11b is sealed in this step. Accordingly, the stacked separators 13, positive electrode current collectors 12, and negative electrode current collectors 14 can be fit in the region surrounded by the film 11.

Note that the film 11 may be subjected to embossing in advance. By embossing, a more bendable secondary battery can be formed.

Figure 8C:
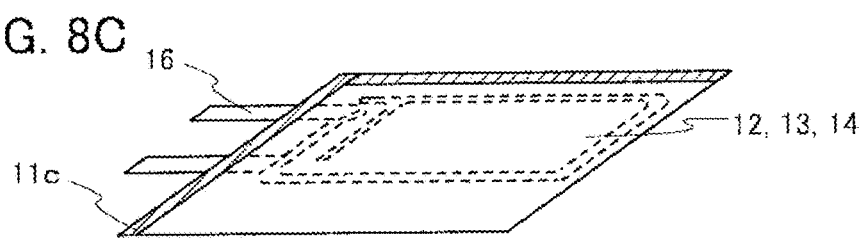

Then, as illustrated in FIG. 8C, the positive electrode current collectors 12, the separators 13, and the negative electrode current collectors 14 are fitted in the region surrounded by the film 11, and one side 11c of the film 11 is sealed by thermocompression bonding. At this time, the lead electrode 16a and the lead electrode 16b are lead to the outside of the region surrounded by the film 11.

Figure 8D:
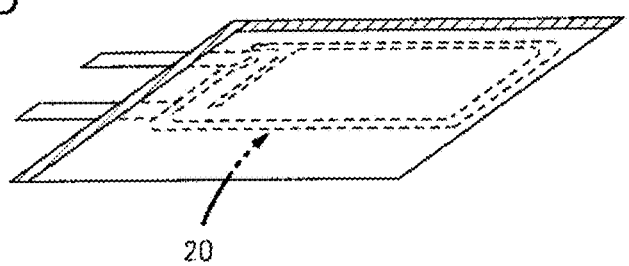
Figure 8E:
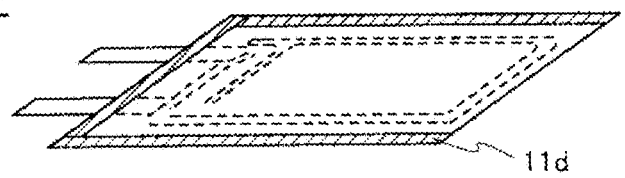

Next, as illustrated in FIG. 8D, an electrolyte solution 20 is injected into the region surrounded by the film 11. Then, as illustrated in FIG. 8E, one remaining side 11d of the film 11 is sealed under vacuum, heat, and pressure. This treatment is performed in an environment from which oxygen is eliminated, for example, in a glove box. The evacuation to a vacuum may be performed with a vacuum sealer, a liquid pouring sealer, or the like. The film 11 can be set between two heatable bars included in the sealer, and sealing can be performed under heat and pressure. An example of the conditions is as follows: the degree of vacuum is 60 kPa, the heating temperature is 190° C., the pressure is 0.1 MPa, and the time is 3 seconds.

Then, the secondary battery obtained through the above-described steps is preferably subjected to aging treatment. By this aging treatment, formation of a film generated at the interface between the electrode and the electrolyte is controlled and the active material can be activated.

Furthermore, the secondary battery that has been subjected to the aging treatment may be opened to let out a gas generated by the aging and then an electrolyte solution may be added and sealing may be performed again. If a gas exists between the positive electrode and the negative electrode, the battery reaction occurs unevenly to cause deterioration. The degassing and resealing steps can suppress deterioration.

Although four sides are sealed in order since the separators 13, the positive electrode current collectors 12, the negative electrode current collectors 14, and the film 11 used in this embodiment are rectangular, one embodiment of the present invention is not limited to this sealing method. In the case of manufacturing a secondary battery having a shape other than the rectangle, the order of sealing or the sealing method can be changed as appropriate.

By partly removing the current collector having the meandering pattern and the positive electrode active material layer in the root portion of the meandering pattern, a bendable battery can be achieved.

This embodiment can be freely combined with Embodiment 1.

Embodiment 3

In this embodiment, examples of electronic devices incorporating the lithium-ion secondary battery described in Embodiment 1 or 2 will be described.

In the secondary battery described in Embodiment 1 or 2, the active material layer is partly removed; therefore, the stress applied to the secondary battery when the secondary battery is bent can be relieved. This secondary battery can be bonded to a support structure body with a curved surface and can change its form reflecting the curved surface of a region of the support structure body that has a large radius of curvature.

Examples of electronic devices each using a flexible power storage device are as follows: display devices (also referred to as televisions or television receivers) such as head-mounted displays and goggle type displays, desktop personal computers, notebook personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of an automobile.

Figure 9A:
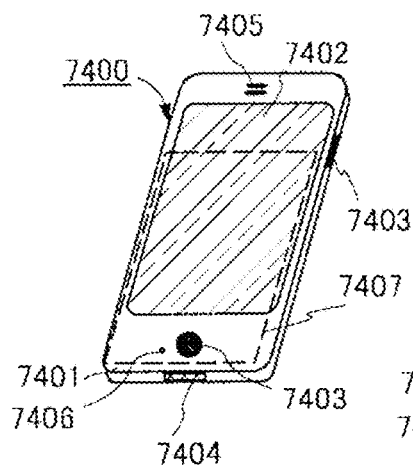
FIGS. 9A to 9H illustrate electronic devices including flexible secondary batteries.

FIG. 9A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 9B:
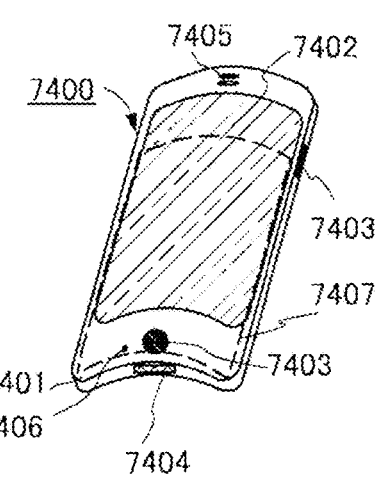
Figure 9C:
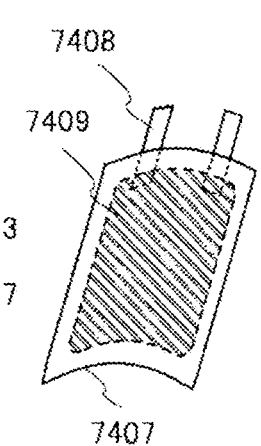

FIG. 9B illustrates the mobile phone 7400 that is bent. When the whole mobile phone 7400 is bent by external force, the power storage device 7407 included in the mobile phone 7400 is also bent. FIG. 9C illustrates the bent power storage device 7407. The power storage device 7407 is a laminated storage battery (also referred to as a layered battery or a film-covered battery). The power storage device 7407 is fixed in the bent state. Note that the power storage device 7407 includes a lead electrode 7408 electrically connected to a current collector 7409. For example, a film serving as an exterior body of the power storage device 7407 is embossed, so that the power storage device 7407 has high reliability even when bent. The mobile phone 7400 may further be provided with a slot for insertion of a SIM card, a connector portion for connecting a USB device such as a USB memory, and the like.

Figure 9D:
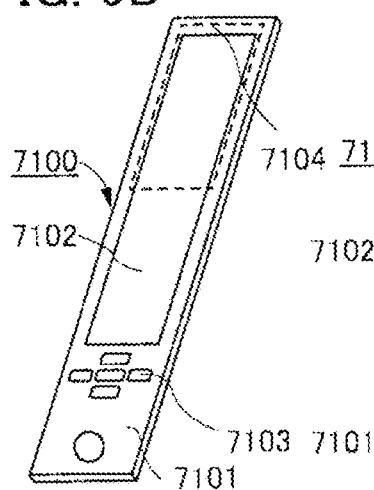
Figure 9E:
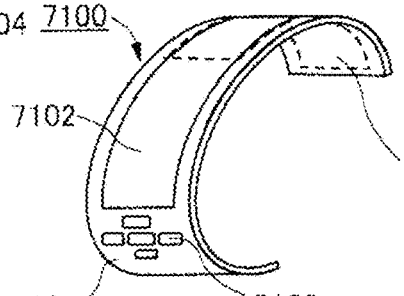
Figure 9F:
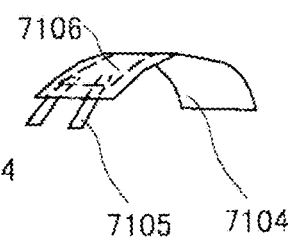
Figure 9G:
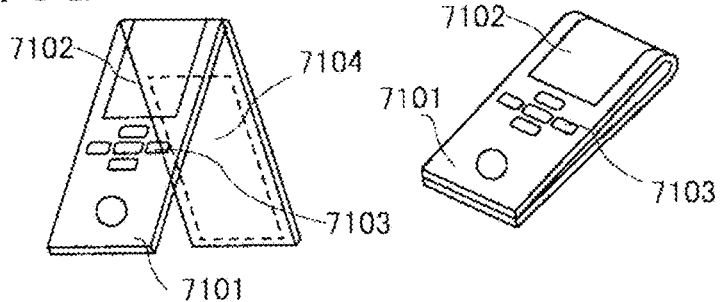
Figure 9H:
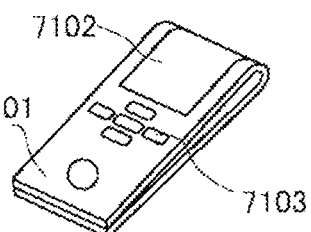

FIG. 9D illustrates an example of a mobile phone that can be bent. When bent to be put around a forearm, the mobile phone can be used as a bangle-type mobile phone as in FIG. 9E. A mobile phone 7100 includes a housing 7101, a display portion 7102, an operation button 7103, and a power storage device 7104. FIG. 9F illustrates the power storage device 7104 that can be bent. When the mobile phone is worn on a user's arm while the power storage device 7104 is bent, the housing changes its form and the curvature of a part or the whole of the power storage device 7104 is changed. Specifically, a part or the whole of the housing or the main surface of the power storage device 7104 is changed in the range of radius of curvature from 10 mm to 150 mm. Note that the power storage device 7104 includes a lead electrode 7105 that is electrically connected to a current collector 7106. For example, pressing is performed to form a plurality of projections and depressions on a surface of the film serving as the exterior body of the power storage device 7104, and retains high reliability even when the power storage device 7104 is bent many times with different curvatures. The mobile phone 7100 may further be provided with a slot for insertion of a SIM card, a connector portion for connecting a USB device such as a USB memory, and the like. When a center portion of the mobile phone illustrated in FIG. 9D is folded, a form illustrated in FIG. 9G can be obtained. When a center portion of the mobile phone is further folded so that end portions of the mobile phone overlap with each other as illustrated in FIG. 9H, the mobile phone can be reduced in size so as to be put in, for example, a pocket of a user's clothes. As described above, the mobile phone illustrated in FIG. 9D can be changed in form in more than one way, and it is desirable that at least the housing 7101, the display portion 7102, and the power storage device 7104 have flexibility in order to change the form of the mobile phone.

Figure 10A:
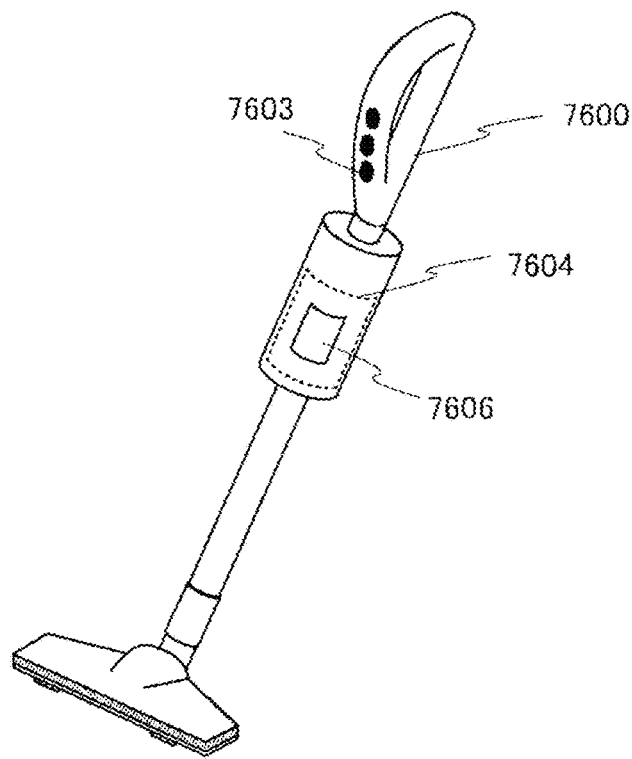
FIGS. 10A to 10C illustrate electronic devices.

FIG. 10A illustrates an example of a vacuum cleaner. By being provided with a secondary battery, the vacuum cleaner can be cordless. To secure a dust collecting space for storing vacuumed dust inside the vacuum cleaner, a space occupied by a power storage device 7604 is preferably as small as possible. For this reason, it is useful to provide the thin power storage device 7604 that can be bent, between the outside surface and the dust collecting space.

Figure 10B:
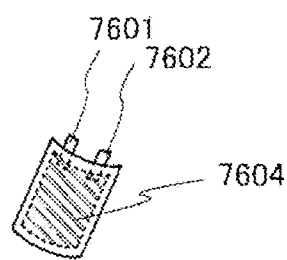

The vacuum cleaner 7600 is provided with operation buttons 7603 and the power storage device 7604. FIG. 10B illustrates the power storage device 7604 that is capable of being bent. A film serving as an exterior body of the power storage device 7604 is embossed, so that the power storage device 7604 has high reliability even when bent. The power storage device 7604 includes a lead electrode 7601 electrically connected to a negative electrode and a lead electrode 7602 electrically connected to a positive electrode.

Figure 10C:
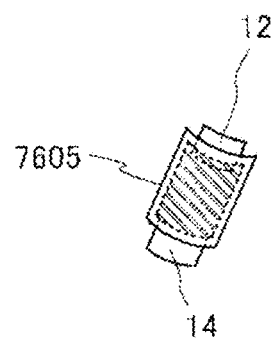

As an example of the power storage device where one lead electrode is exposed from each short side of an exterior body, a power storage device 7605 that is capable of being bent is illustrated in FIG. 10C. The power storage device 7605 has a structure in which a current collector or a lead electrode is exposed from each of two short sides of an exterior body. A film serving as the exterior body of the power storage device 7605 may also be embossed, in which case the power storage device 7605 can be bent and have high reliability.

The thin power storage device 7604 can be fabricated by the method for manufacturing a secondary battery that is described in Embodiment 1 or 2.

The thin power storage device 7604 has a laminated structure and is bent and fixed. The vacuum cleaner 7600 includes a display portion 7606 that displays, for example, the remaining amount of power in the thin power storage device 7604. A display area of the display portion 7606 is curved to fit the shape of the outer surface of the vacuum cleaner. The vacuum cleaner includes a connection cord for being connected to a receptacle. When the thin power storage device 7604 is charged to have sufficient power, the connection cord can be removed from the receptacle to use the vacuum cleaner. The thin power storage device 7604 may be charged wirelessly without using the connection cord.

The use of power storage devices that can be bent in vehicles enables production of next-generation clean energy vehicles such as hybrid electric vehicles (HEVs), electric vehicles (EVs), and plug-in hybrid electric vehicles (PHEVs). Moreover, power storage devices that can be bent can also be used in movable objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 11A:
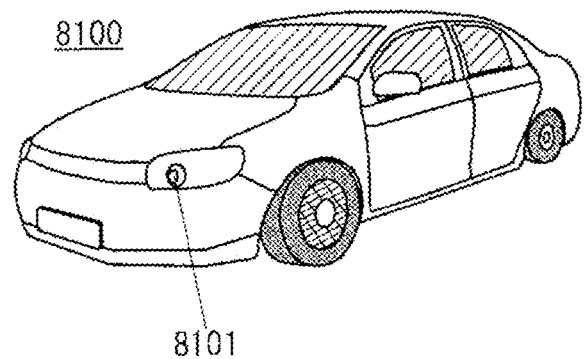
FIGS. 11A and 11B illustrate vehicles including secondary batteries.
Figure 11B:
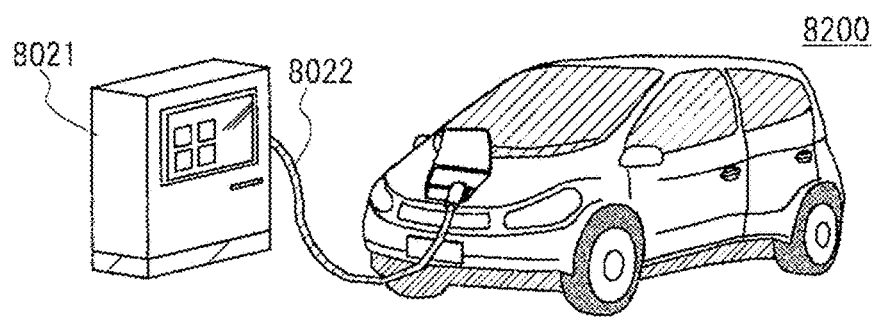

FIGS. 11A and 11B each illustrate an example of a vehicle fabricated according to one embodiment of the present invention. An automobile 8100 illustrated in FIG. 11A is an electric vehicle that runs on the power of an electric motor. Alternatively, the automobile 8100 is a hybrid electric vehicle capable of driving using either the electric motor or the engine as appropriate. In the case of providing a laminated secondary battery in the vehicle, a battery module including a plurality of laminated secondary batteries is placed in one place or more than one place. According to one embodiment of the present invention, a power storage device itself can be made more compact and lightweight, and for example, when the power storage device having a curved surface is provided on the inside of a tire of a vehicle, the vehicle can be a high-mileage vehicle. Furthermore, a power storage device that can have various shapes can be provided in a small space in a vehicle, which allows a space in a trunk and a space for riders to be secured. The automobile 8100 includes the power storage device. The power storage device is used not only to drive the electric motor, but also to supply electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 11B illustrates an automobile 8200 including the power storage device. The automobile 8200 can be charged when the power storage device is supplied with electric power through external charging equipment by a plug-in system, a contactless power feeding system, or the like. In FIG. 11B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, since the power storage device can be bent, the degree of flexibility in place where the power storage device can be provided is increased and thus a vehicle can be designed efficiently. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving radius. Furthermore, the power storage device included in the vehicle can be used as a power source for supplying electric power to products other than the vehicle. In such a case, the use of a commercial power source can be avoided at peak time of electric power demand.

This embodiment can be freely combined with Embodiment 1 and 2.

Note that what is described (or part thereof) in one embodiment can be applied to, combined with, or replaced with different contents in the embodiment and/or what is described (or part thereof) in another embodiment or other embodiments.

Note that in each embodiment, what are described in the embodiment are contents described with reference to a variety of drawings or contents described with text described in this specification.

Note that by combining a drawing (or may be part of the drawing) illustrated in one embodiment with another part of the drawing, a different drawing (or may be part of the different drawing) illustrated in the embodiment, and/or a drawing (or may be part of the drawing) illustrated in another embodiment or other embodiments, much more drawings can be formed.

Note that contents that are not specified in any drawing or text in the specification can be excluded from one embodiment of the invention. Alternatively, when the range of a value that is defined by the maximum and minimum values is described, the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferably 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Furthermore, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a drawing or text described in one embodiment can be taken out to constitute one embodiment of the invention. Thus, in the case where a drawing or text related to a certain portion is described, the contents taken out from part of the drawing or the text are also disclosed as one embodiment of the invention, and one embodiment of the invention can be constituted. The embodiment of the present invention is clear. Therefore, for example, in a drawing or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the drawing or the text is taken out, and one embodiment of the invention can be constituted. For example, from a circuit drawing in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a drawing or text described in one embodiment in this specification and the like, it will be readily appreciated by those skilled in the art that a broader concept of the specific example can be derived. Therefore, in the drawing or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a drawing (which may be part of the drawing) is disclosed as one embodiment of the invention, and one embodiment of the invention can be constituted. Therefore, when certain contents are described in a drawing, the contents are disclosed as one embodiment of the invention even when the contents are not described with text, and one embodiment of the invention can be constituted. In a similar manner, part of a drawing, which is taken out from the drawing, is disclosed as one embodiment of the invention, and one embodiment of the invention can be constituted. The embodiment of the present invention is clear.

Example

In this example, a secondary battery with the positive electrode active material partly removed and a secondary battery without the removal were fabricated and compared after being charged.

<Sample with the Removal Treatment of the Positive Electrode Active Material>

The secondary battery with the positive electrode active material partly removed was fabricated in the following manner.

As a positive electrode active material, $LiCoO_2$ was used, and acetylene black (AB) and PVDF as a conductive additive and a binder were mixed thereto. The mixing proportion of $LiCoO_2$, AB, and PVDF was as follows: $LiCoO_2$ at 90 wt %, AB at 5 wt %, and PVDF at 5 wt %. As a positive electrode current collector, aluminum with a thickness of 20 μm was used. One surface of the positive electrode current collector was coated with the mixture of $LiCoO_2$, AB, and PVDF. Thus, the positive electrode active material layer was formed.

Then, the positive electrode active material layer over two areas, which are a region having a small width that is connected to an electrode lead in a later step and an area having a small width in a meandering portion, was selectively removed by laser light irradiation. Then, laser irradiation may be performed so that the contour of the current collector including the meandering portion was irradiated; thus, both the positive electrode active material layer and the metal foil were selectively removed. In this manner, the positive electrode current collector and the positive electrode active material layer having the shape illustrated in FIG. 6A were formed.

Graphite was used as a negative electrode active material, and a vapor grown carbon fiber (VGCF (registered trademark)), carboxymethyl cellulose (CMC), and styrene-butadiene rubber (SBR) as a conductive additive and a binder were mixed thereto. The mixing proportion of graphite, VGCF, CMC, and SBR was as follows: graphite at 96 wt %, VGCF at 1 wt %, CMC at 1 wt %, and SBR at 2 wt %.

Copper with a thickness of 18 μm was used as a negative electrode current collector. One surface of the negative electrode current collector was coated with the mixture of graphite, VGCF, CMC, and SBR. Thus, the negative electrode active material layer was formed.

Then, the negative electrode active material over a region having a small width that is connected to an electrode lead in a later step was selectively removed by laser light irradiation. Then, laser irradiation was performed so that the contour of the current collector including the meandering portion was irradiated; thus, both the negative electrode active material layer and the metal foil were selectively removed. In this manner, the negative electrode current collector and the negative electrode active material layer having the shape illustrated in FIG. 6C were formed.

An electrolyte solution was formed by dissolving 1.2 mol/L of $LiPF_6$ in an organic solvent in which EC, DEC, and EMC were mixed at a weight ratio of 3:6:1, and adding 0.5 wt % of propanesultone (PS) and 0.5 wt % of vinylene carbonate (VC) thereto as an additive.

As a separator, polypropylene was used.

As an exterior body, an aluminum laminate film was used.

Using one piece of the above-described positive electrode current collector, one piece of the above-described negative electrode current collector, the electrolyte solution, the separator, and the exterior body, a secondary battery was fabricated in accordance with the manufacturing method described in Embodiment 1. This is the sample with the removal treatment of the positive electrode active material.

<Sample without the Removal Treatment>

Another secondary battery that is not subjected to the removal treatment of the positive electrode active material was fabricated in a manner similar to that of the sample with the removal treatment of the positive electrode active material, except that the positive electrode active material layer over the area having a small width in the meandering portion was not removed by the laser light irradiation step.

<Charging>

The sample with the removal treatment of the positive electrode active material and the sample without the removal treatment were charged under the same conditions. The charging conditions were as follows: 4.1 V, a rate of 0.3 C, constant current constant voltage (CCCV), a termination current of 0.01 C, and 25° C.

<Electrode Comparison after Charging>

Figure 12A:
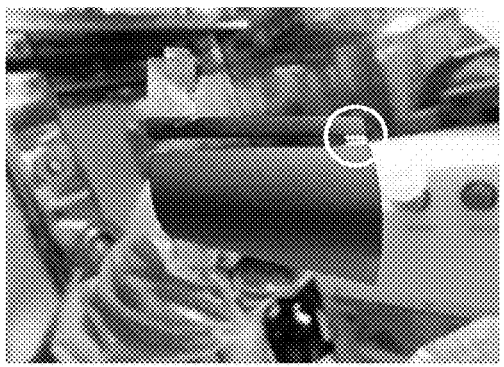
FIGS. 12A to 12D are photographs of positive electrodes and negative electrodes.
Figure 12B:
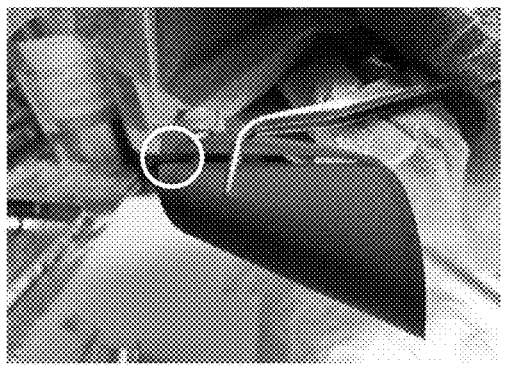

Photographs of the positive electrode current collector and the negative electrode current collector of the sample with the removal treatment of the positive electrode active material after charging are shown in FIGS. 12A and 12B, respectively. A portion surrounded by a circle in FIG. 12A is the area having a small width in the meandering portion, where the positive electrode active material was removed. A portion surrounded by a circle in FIG. 12B is a portion overlapping with the area having a small width in the meandering portion of the positive electrode current collector.

Figure 12C:
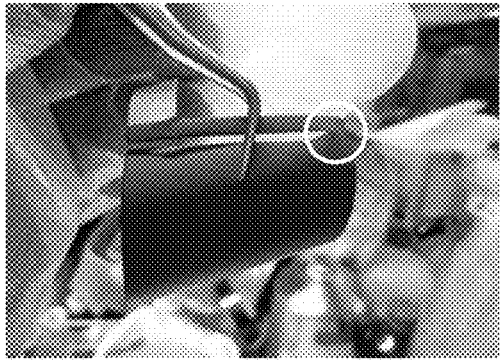
Figure 12D:
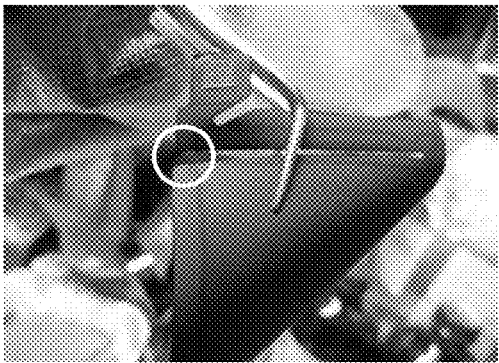

Photographs of the positive electrode current collector and the negative electrode current collector of the sample without the removal treatment after charging are shown in FIGS. 12C and 12D, respectively. A portion surrounded by a circle in FIG. 12C is the area having a small width in the meandering portion, where the positive electrode active material was not removed. A portion surrounded by a circle in FIG. 12D is a portion overlapping with the area having a small width in the meandering portion of the positive electrode current collector.

Figure 13A:
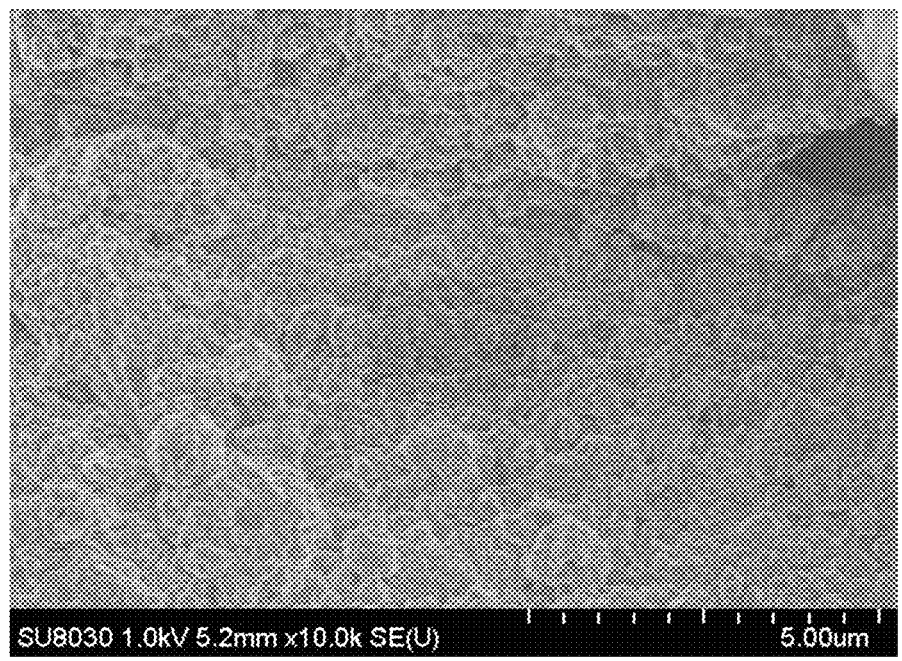
FIGS. 13A and 13B are scanning electron micrographs of negative electrodes after charging.
Figure 13B:

The negative electrode current collector after charging was observed with a scanning electron microscope (SEM). Electron micrographs of the negative electrode active material that is closest to the area having a small width in the meandering portion of the positive electrode current collector in the negative electrode current collector, that is, the negative electrode active material that is closes to the slit are shown in FIGS. 13A and 13B. FIG. 13A shows the negative electrode current collector of the sample with the removal treatment of the positive electrode active material, and FIG. 13B shows the sample without the removal treatment.

According to FIG. 13A, the sample with the removal treatment of the positive electrode active material does not have any abnormality on the surface of the negative electrode active material. In contrast, the sample without the removal treatment shown in FIG. 13B includes needle-like products, which was found to be lithium precipitated on the surface of the negative electrode active material.

The above-described consequence reveals that partly removing the positive electrode active material can suppress the precipitation of lithium on the surface of the negative electrode active material.

This application is based on Japanese Patent Application serial no. 2014-143536 filed with Japan Patent Office on Jul. 11, 2014 and Japanese Patent Application serial no. 2014-194876 filed with Japan Patent Office on Sep. 25, 2014, the entire contents of which are hereby incorporated by reference.

What is claimed is:

1. A secondary battery comprising:
a current collector;
a plurality of active material layers in contact with the current collector; and
an electrolyte solution in contact with the current collector and the plurality of active material layers,
wherein the current collector comprises a meandering portion,
wherein the meandering portion includes two or more portions having a small width, and at least one of the two or more portions overlaps with a boundary between adjacent active material layers of the plurality of active material layers,
wherein a first active material layer of the plurality of active material layers is adjacent to a second active material layer of the plurality of active material layers,
wherein a third active material layer of the plurality of active material layers is adjacent to the second active material layer of the plurality of active material layers,
wherein the first to third active material layers each are in contact with the same surface of the current collector, and
wherein a distance between the first active material layer and the second active material layer is different from a distance between the second active material layer and the third active material layer.

2. The secondary battery according to claim 1,
wherein the active material layer comprises a positive electrode active material or a negative electrode active material.

3. The secondary battery according to claim 1,
wherein the active material layer comprises lithium.

4. The secondary battery according to claim 1, further comprising an exterior body,
wherein the exterior body is a film, and
wherein the current collector is surrounded by the exterior body.

5. The secondary battery according to claim 1,
wherein the current collector is a metal foil containing any one of gold, platinum, iron, nickel, copper, aluminum, titanium, tantalum, and manganese.

6. The secondary battery according to claim 1, wherein the meandering portion is a bendable portion of the secondary battery.

7. The secondary battery according to claim 1, wherein the plurality of active material layers are arranged in either a long-side direction or a short-side direction of the current collector with a distance provided therebetween.

8. The secondary battery according to claim 1,
wherein a fourth active material layer of the plurality of active material layers is overlapped with the first and second active material layers through the current collector.

9. The secondary battery according to claim 1,
wherein a fourth active material layer of the plurality of active material layers is overlapped with the first active material layer through the current collector,
wherein a fifth active material layer of the plurality of active material layers is overlapped with the second active material layer through the current collector, and
wherein a distance between the fourth active material layer and the fifth active material layer is the same as the distance between the first active material layer and the second active material layer.

10. A secondary battery comprising:
a current collector;
a plurality of active material layers in contact with one surface of the current collector; and
an electrolyte solution in contact with the current collector and the plurality of active material layers,
wherein the current collector comprises a meandering portion,
wherein the meandering portion includes two or more portions having a small width, and at least one of the two or more portions overlaps with a boundary between adjacent active material layers of the plurality of active material layers,
wherein a first active material layer of the plurality of active material layers is adjacent to a second active material layer of the plurality of active material layers,
wherein a third active material layer of the plurality of active material layers is adjacent to the second active material layer of the plurality of active material layers, and
wherein a distance between the first active material layer and the second active material layer is different from a distance between the second active material layer and the third active material layer.

11. The secondary battery according to claim 10,
wherein the active material layer comprises a positive electrode active material or a negative electrode active material.

12. The secondary battery according to claim 10,
wherein the active material layer comprises lithium.

13. The secondary battery according to claim 10, further comprising an exterior body,
wherein the exterior body is a film, and
wherein the current collector is surrounded by the exterior body.

14. The secondary battery according to claim 10,
wherein the current collector is a metal foil containing any one of gold, platinum, iron, nickel, copper, aluminum, titanium, tantalum, and manganese.

15. The secondary battery according to claim 10, wherein the meandering portion is a bendable portion of the secondary battery.

16. The secondary battery according to claim 10, wherein the plurality of active material layers are arranged in either a long-side direction or a short-side direction of the current collector with a distance provided therebetween.

* * * * *